United States Patent

[11] 3,537,535

| [72] | Inventor | James G. Davis |
| | | 111 Bessemer City Road, Gastonia, North Carolina 28052 |
| [21] | Appl. No. | 794,124 |
| [22] | Filed | Jan. 27, 1969 |
| [45] | Patented | Nov. 3, 1970 |

[54] CULTIVATING PLOW
9 Claims, 8 Drawing Figs.

[52] U.S. Cl. .................................................. 172/767, 172/534
[51] Int. Cl. ..................................................... A01b 31/00
[50] Field of Search............................................ 172/534, 536, 537, 539, 540, 686, 694, 697, 721, 734, 736, 767, 771; 94/45

[56] References Cited
UNITED STATES PATENTS

| 168,516 | 10/1875 | Miller | 172/767X |
| 367,399 | 8/1887 | Holaday | 172/537X |
| 463,229 | 11/1891 | Hiestand | 172/540X |
| 679,713 | 7/1901 | Whitson | 172/686X |
| 1,051,811 | 1/1913 | Jikihara | 172/694X |
| 1,550,225 | 8/1925 | Patterson | 172/686 |
| 2,574,379 | 11/1951 | Cummings | 172/537X |

*Primary Examiner*—Robert E. Pulfrey
*Assistant Examiner*—James W. Peterson
*Attorney*—Hunt, Heard & Rhodes ABSTRACT: The present invention is directed to a primary cultivating device capable of use much sooner after seedlings are planted than in the case in previous known devices. More specifically the cultivating device comprises a pair of spaced, heavy, non-rotating, hemispherically shaped, earth working members attached to a framework which in turn is propelled behind a tractor, by hand, or by some other suitable drive means.

Patented Nov. 3, 1970

INVENTOR.
JAMES G. DAVIS
BY Hunt + Rhodes
ATTORNEY

Patented Nov. 3, 1970 3,537,535
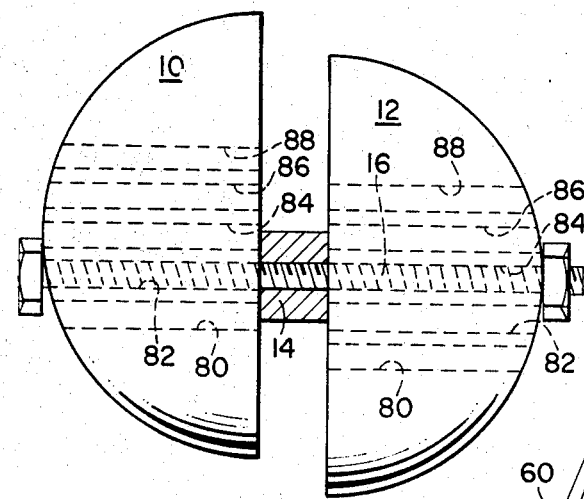
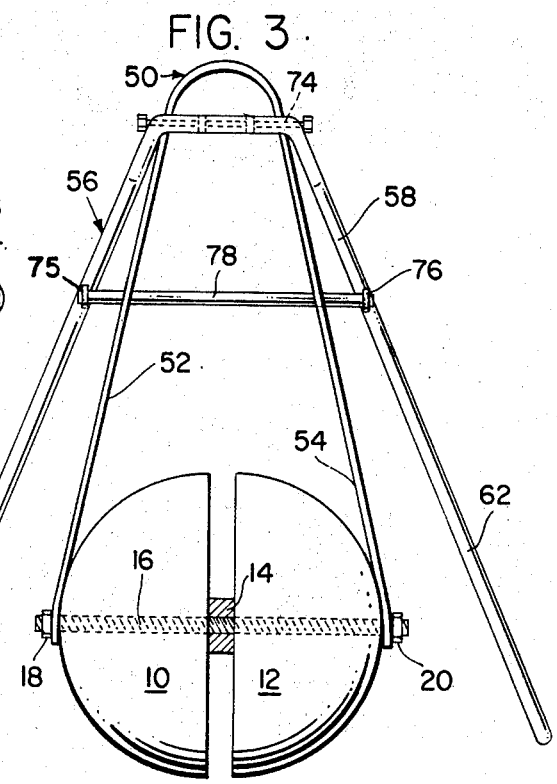
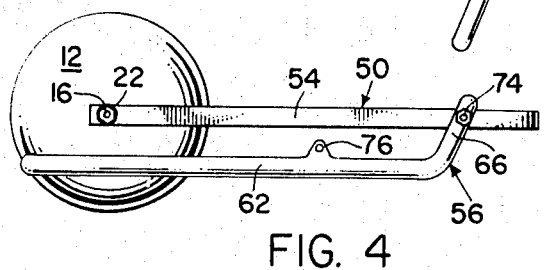
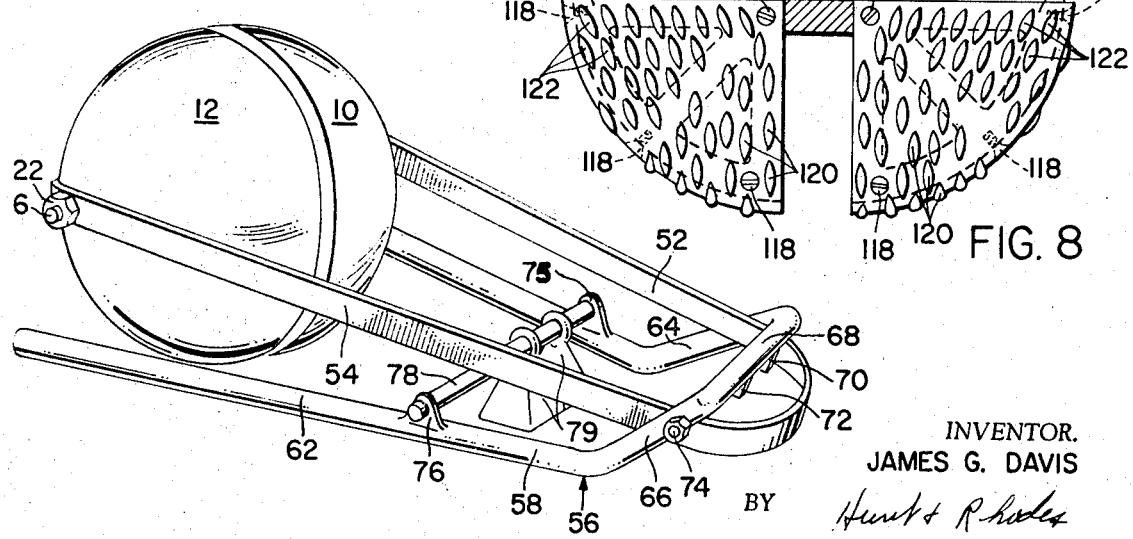
INVENTOR.
JAMES G. DAVIS
BY Hunt & Rhodes
ATTORNEY

CULTIVATING PLOW

Cultivating devices presently available for agricultural use are generally unsatisfactory in working around very young seedlings, in that the blade or working tool must be kept far enough away from the seedlings in their delicate condition to insure that no damage is done. At such a distance from the seedling, many of the beneficial results obtained from cultivating may not be accomplished. Moreover, presently known cultivating plows that loosen the ground around the seedling leave the soil in too loose a condition, while those that compact the soil sufficiently, either do not have enough stirring effect, or else are rolled along the furrow, leaving the ground in an unlevel condition.

The present invention on the other hand is particularly adapted for use in the area close to very young seedlings without harm, and may thus be used 10 to 15 days sooner than devices which are presently being used. Moreover, the plow of the present invention is heavy with a curved bottom surface, and is dragged as opposed to rolled, along the furrow, thus tending to cultivate and level, as well as slightly compacting, the soil around the seedling.

It is therefore an object of this invention to provide a cultivating plow which may be used around young seedlings much sooner than is the case with those presently in use.

It is another object of the invention to provide a cultivating plow which levels and compacts as well as cultivates as it is moved along a furrow.

It is yet another and more specific object of the invention to provide a cultivating plow for use around very young seedlings which is dragged along a furrow and in a non-rotating position, rather than being rolled along the furrow as is customary.

These and other objects and advantages will become more apparent upon reference to the following description taken in connection with the accompanying drawings, in which:

FIG. 3 is a plan view with parts broken away, showing an alternate embodiment of the invention shown in FIGS. 1 and 2;

FIG. 4 is a side elevation of the device shown in FIG. 3;

FIG. 5 is a perspective view of the embodiment shown in FIGS. 3 and 4;

FIG. 7 is a plan view illustrating the manner in which the modified hemispherical members shown in FIG. 6 are assembled; and FIG. 8 is an elevation view of the plow portion itself according to a further modification.

Figure 1:
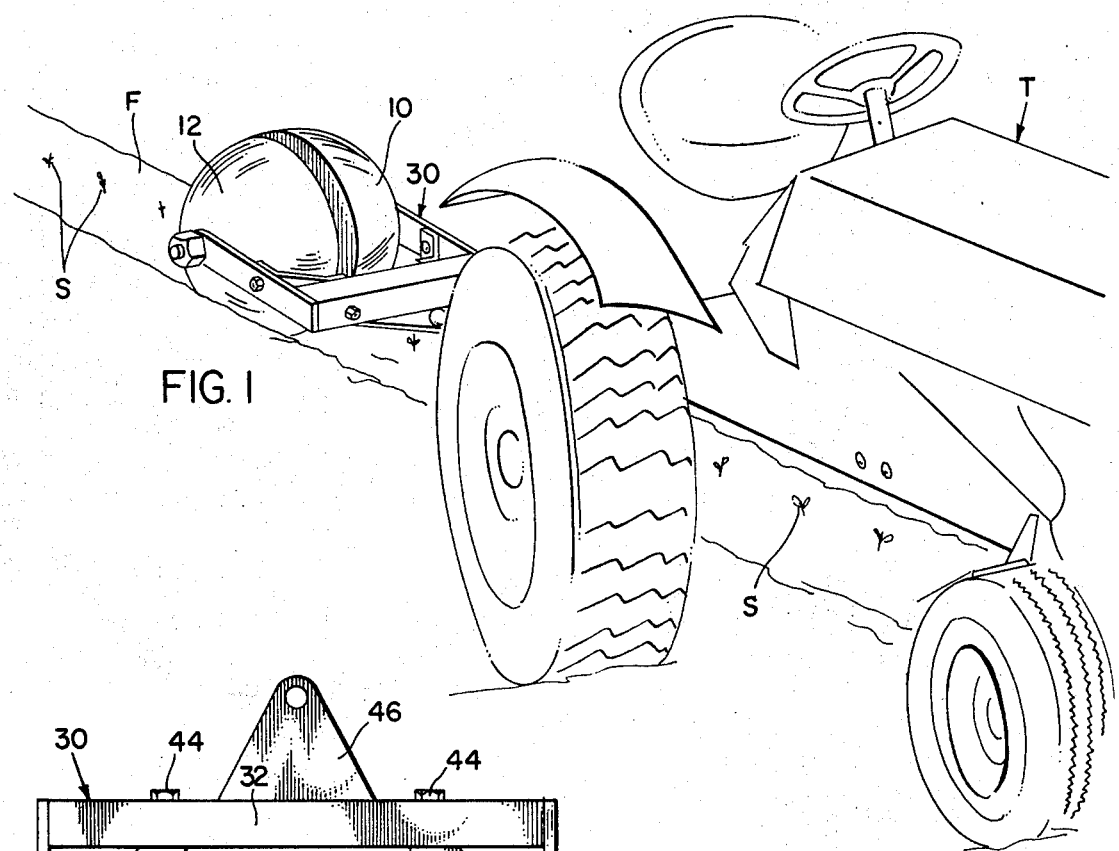
FIG. 1 is a perspective view with parts broken away showing the cultivating plow according to the present invention in use behind a tractor.

Turning now to the drawings and more particularly to FIG. 1, there is illustrated the cultivating plow according to the present invention, comprising two hemispherical earthworking members 10 and 12, secured in fixed or non-rotatable relation to each other and onto towing frame 30. Tractor T is connected to frame 30 and drags the plow along furrow F in which young seedlings S have been recently planted.

Figure 2:
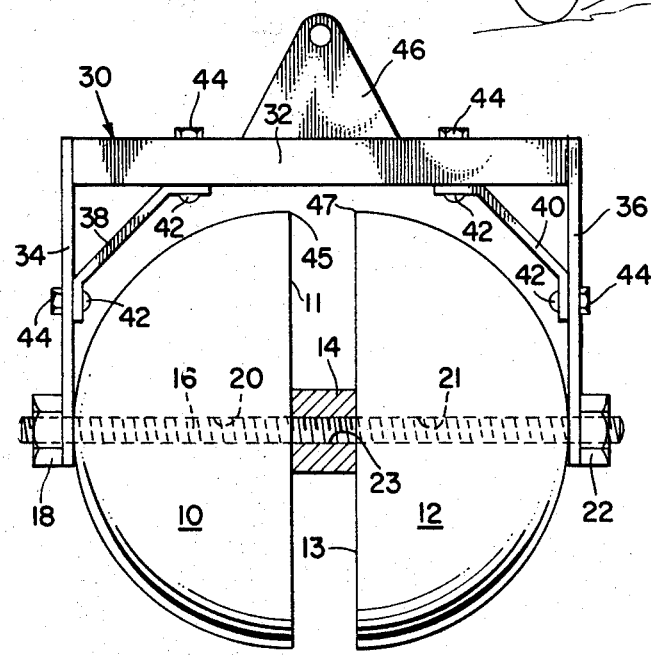
FIG. 2 is a plan view of the device according to the present invention.

As illustrated thus by FIG. 2, hemispherical members 10 and 12 having relatively flat inner faces 11 and 13 respectively are separated by a spacer sleeve 14. Each of the hemispherical members 10 and 12 and the spacer sleeve 14 include a passageway 20, 21 and 23 respectively, and when assembled, the individual passageways are so aligned as to form one continuous passageway. A threaded rod 16 is inserted through passageways 20, 21 and 23, and through aligned openings in arms 34 and 36 of frame 30. A pair of nuts 18 and 22 retain earthworking members 10 and 12 in their relatively stationary position and fixably attach the plow to frame 30.

Towing frame 30 comprises a front tow bar 32 having a forwardly extending hitch 46 secured thereto, to which a tow vehicle may be attached in some suitable manner for propelling the plow. A pair of arms 34 and 36 extend rearwardly from tow bar 32 and include openings at the rearward end thereof for receiving threaded shaft 16 as heretofore described. Angular braces 38 and 40 provide additional support between tow bar 32 and arms 34 and 36, the braces being attached to each member by screws 42 and nuts 44.

In use, the hemispherical earthworking members 10 and 12 are dragged along the furrow F with their inner walls 11 and 13 straddling the young seedlings in the bottom thereof while working the soil very near thereto. The combined weight of members 10 and 12 is approximately 70 to 75 pounds and their diameters range from 6 to 15 inches. The heavy members 10 and 12 act as clod crushers toward the edges of the furrow as the sharper inner edges 45 and 47 loosen the dirt around the seedlings in the center of the furrow. Moreover, the dragging action causes the hemispherical portions 10 and 12 to level the soil in the bottom of the furrow, similar to the manner in which a bulldozer blade operates, whereas if the device rolled along the furrow, it would tend to rise and fall with the unevenness of the soil since rolling reduces the friction. It should be pointed out that although the members 10 and 12 are shown and described as being hemispherical, they may be any suitable shape as long as the lower surface is curved generally to fit in the furrow.

Although the hemispherical members 10 and 12 shown in FIG. 2 are solid, FIG. 8 shows an alternate embodiment in which hemispherical members 110 and 112 are merely skeletons or shells formed or cast from low cost metal or high-grade concrete to which working heads 114 and 116 are attached by screws 118 or other appropriate means around at least the lower portion thereof. Working heads 114 and 116 may further be provided with protuberances or treads 120 which extend outwardly of the surface of heads 114 and 116 for the purpose of scoring or stirring the soil. If the soil in the furrow were left in a smooth condition, the surface would tend to become glazed or baked to a hard crust. The scoring will also destroy grass and weeds in the furrow better than a smooth surface such as that on members 10 and 12.

It should be noticed that treads 120 are generally oval in shape with the longitudinal dimension of the tread extending in the direction of movement. Treads 122 are of the same general shape, except that their longitudinal dimension is set at an angle to the direction of movement to increase the scoring effect. One or both of these arrangements or a combination of the two may be used as desired either on the skeleton-like members 110 and 112 or on hemispherical members 10 and 12. Also the number of protuberances 120 or 122 may vary according to the condition or type of soil being worked or the type of seedlings planted.

Turning now to FIGS. 3 through 5, there is shown a second alternate embodiment of the present invention, which generally comprises an additional attachment mounted to the cultivating plow shown in FIGS. 1 and 2, for the purpose of carrying additional weights thereon. It is especially useful for rough, uneven, or trashy soil surfaces and when the ground adjacent each side of the furrow needs clearing or evening.

A different towing frame is required with this embodiment and comprises generally a U-shaped tow bar 50 having rearwardly extending arms 52 and 54 terminating at a point substantially adjacent the hemispherical members 10 and 12. An opening in arms 52 and 54 receives shaft 16 therethrough for securing the hemispherical members 10 and 12 to said towing bar 50 similar to the manner in which they are secured to towing frame 30 in FIGS. 1 and 2.

A clearing frame 56 is mounted in some suitable manner to the front end of U-shaped member 50 and comprises also a generally U-shaped member 58 having rearwardly extending legs or runners 60 and 62 which diverge further than legs 52 and 54 of frame 50, so that the ground on either side of the furrow may be cleaned and levelled. Legs 60 and 62 are disposed beneath framework 50 and above the lower portion of members 10 and 12 which is received in the furrows being cultivated. The vertical distance between the lower surface of earthworking members 10 and 12 and runners 60 and 62 is approximately equal to the depth of the furrow F being worked. The forward portion of legs 60 and 62 terminate in a pair of inclined ends 64 and 66 respectively, connected by a horizontal cross member 68. A pair of lugs 70 and 72 protrude downwardly from cross member 68 into the area between legs 52 and 54 of frame 50, and a pin 74 connects clearing frame 56 to towing frame 50 through corresponding aligned openings in legs 52 and 54 and in lugs 70 and 72.

A pair of ears 75 and 76 project upwardly from horizontal legs 60 and 62 respectively at a suitable point along the length thereof and support shaft 78 therebetween to which additional weights 79 may be added. The additional weights 79 aid in the cultivating effect of members 10 and 12, and runners 60 and 62 clear and level the area on either side of furrow F as the cultivating plow is dragged along the furrow.

Figure 6:
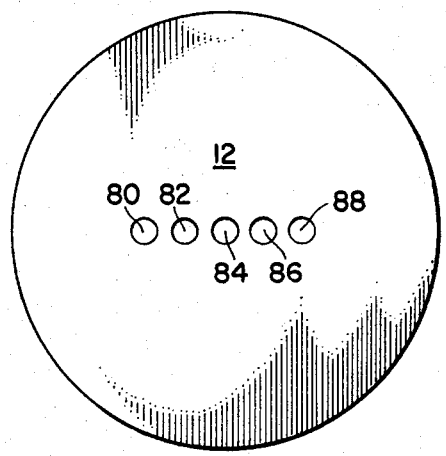
FIG. 6 is a side elevation of one of the hemispherical members, showing a second alternate embodiment of the invention illustrated in FIGS. 1 and 2.

Under certain soil conditions, if the hemispherical earthworking members are aligned, the plow may have a tendency to drag trash or too much soil onto the young seedlings. By offsetting the members 10 and 12 as shown in FIGS. 6 and 7 in relation to each other, this problem may be eliminated. Passageways 80, 82, 84, 86 and 88 are provided in hemispherical member 12 and replace the single passageway 21 shown in FIG. 2. The other hemispherical member 10 is similarly provided with a like number of similar passageways, whereby shaft 16 may be inserted through one of said passageways, for example passageway 84 in hemispheric member 12 and through another passageway, for example passageway 82 in hemispheric member 10. So arranged, the plow halves 10 and 12 are offset from each other, resulting in a completely different cultivating effect on the seedlings, which may be desirable under certain soil conditions as described above.

It will be understood that various modifications may be made to the embodiments shown whereby the invention could be adapted to different usages and conditions, and accordingly, it is desired that such modifications as may fall within the scope of the appended claims are considered to be within this invention.

I claim:

1. A cultivating plow comprising a frame having a pair of arms extending rearwardly therefrom, a shaft extending between the free ends of said arms, a pair of hemispherical members each having a base positioned on said shaft in spaced relation with the base of each member facing each other, a spacer positioned on said shaft between said hemispherical members for retaining said members in spaced relation, said arms engaging the outer surface of said hemispherical members, and a means for clamping said arms into non-rotatable engagement with said surfaces, whereby said plow is non-rotatable in operation.

2. The plow according to claim 1 wherein each of said hemispherical members includes a horizontal passageway therethrough, the passageways being aligned with each other to form a continuous opening through both members, said shaft extending through said aligned passageways in said members to fixedly secure said members to said frame.

3. The plow according to claim 1 and further comprising a curved shell attached to the lower surfaces of each of said hemispherical members, said shells including a plurality of protuberances extending from the surfaces thereof to stir and score the soil in the furrow.

4. The cultivating plow according to claim 1 and further including a clearing frame attached to said frame, said clearing frame including a pair of rearwardly and outwardly extending runners positioned slightly above the lower surface of said hemispherical members, the distance between the lower surface of said earthworking members and said runners equaling the approximate depth of the furrow being worked.

5. The cultivating plow according to claim 4 wherein said clearing frame includes a means thereon for carrying additional weights.

6. The cultivating plow according to claim 1 wherein said hemispherical members are offset relative to each other.

7. The cultivating plow according to claim 6 wherein the means for offsetting said hemispherical members includes a plurality of passageways extending laterally through each member, each of said passageways being capable of receiving a portion of said shaft extending through said members.

8. The plow according to claim 1 wherein each of said hemispherical members comprises a skeleton-like framework having a curved shell fixed to the lower portion thereof.

9. The plow according to claim 8 wherein said shells include a plurality of protuberances extending from the surface thereof to stir and score the soil in the furrow.